Nov. 16, 1965  W. E. KEMP  3,217,661
HATCH COVER STRUCTURE
Filed Dec. 2, 1963  3 Sheets-Sheet 1
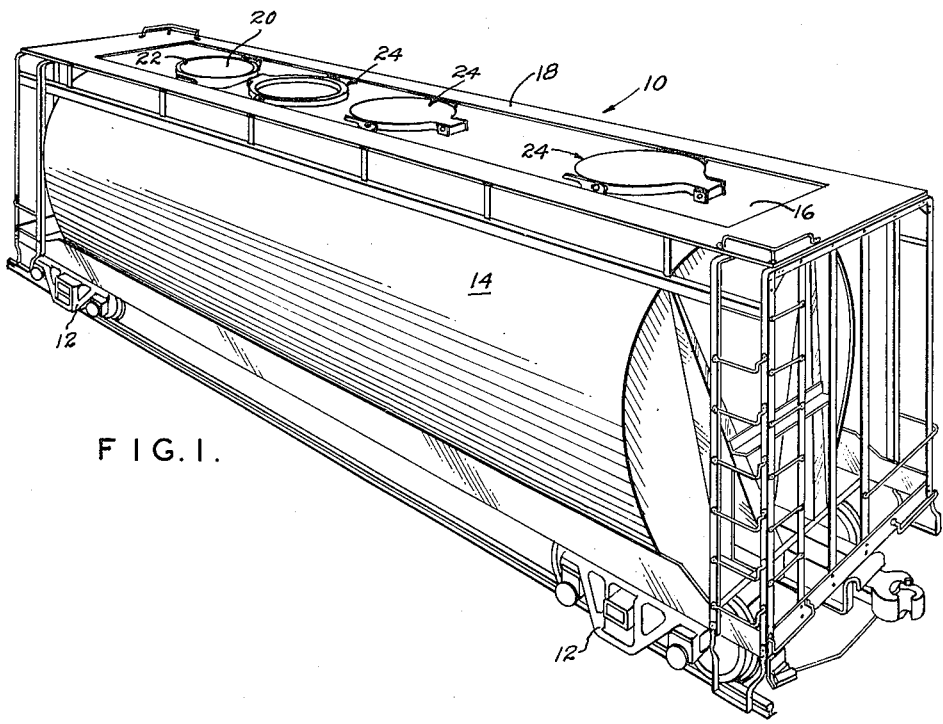
FIG. 1.
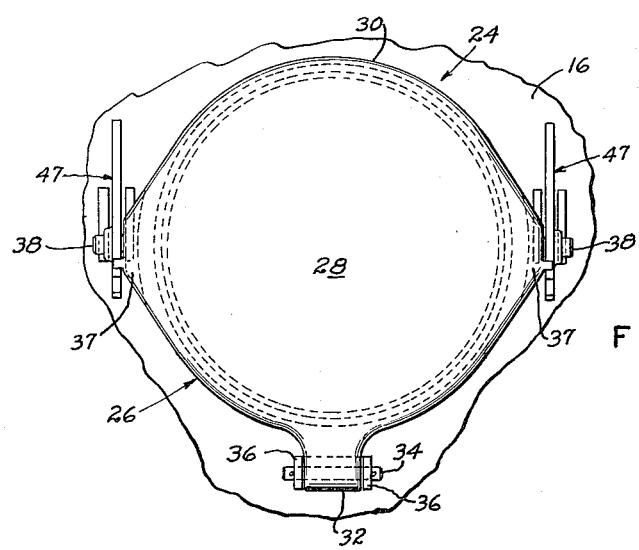
FIG. 2.
INVENTOR.
WILLARD E. KEMP
AGENT

United States Patent Office 3,217,661
Patented Nov. 16, 1965

3,217,661
HATCH COVER STRUCTURE
Willard E. Kemp, Bridgeton, Mo., assignor to ACF Industries, Incorporated, New York, N.Y., a corporation of New Jersey
Filed Dec. 2, 1963, Ser. No. 327,465
10 Claims. (Cl. 105—377)

This invention relates to hatch cover structures and more particularly to a hatch cover assembly or structure in which a hatch cover is movable between open and closed positions relative to an associated hatch opening.

It is difficult to maintain a tight seal between a hatch cover and the hatch opening in closed vessels, as manufacturing tolerances vary to quite an extent in the fabrication of hatch covers. This results from distortions of hatch covers which frequently occur after periods of extended use thereby necessitating relatively large tolerances. A tight seal between the hatch cover and hatch opening is required to prevent moisture and foreign matter, such as dust, from entering the interior of the closed vessel on which the cover is positioned and possibly contaminating the lading.

Further, in the event the hatch assembly is employed with a closed hopper or vessel in which a pressure differential exists between the interior of the car and the atmosphere, an air-tight seal is necessary to retain the desired air pressure within the vessel. Heretofore, it has been difficult to provide a hatch cover having a seal which effectively seals the hatch cover in air-tight relation under substantial air pressures within the interior of the vessel and yet may be easily opened and closed. Many of the prior art hatch covers have employed seals on the hatch cover to engage the upper rim or edge of a hatch ring surrounding the hatch cover and these require a relatively high closing force to maintain the air-tight seal between the cover and ring. Also, a relatively high opening force is required to open the hatch covers after being tightly closed. In some instances, three or more positions about the periphery of a hatch cover are employed to apply force to the hatch cover for effectively closing the cover. The use of a relatively large number of positions necessitates a separate force applying device, such as a hand wheel and associated screw, for each of such positions resulting in a relatively expensive fabrication as well as being time consuming in the tightening and the subsequent release of each of the force applying devices separately.

It is an object of the present invention to provide a hatch cover assembly for a closed vessel in which sealing means effectively seals the hatch opening while permitting relatively large clearances between the hatch cover and associated ring thereby allowing the hatch cover to be easily opened and closed.

A further object of this invention is the provision of a hatch cover assembly in which a minimum number of positions is employed for applying force to the hatch cover for closing and sealing the cover about the hatch opening thereby to obtain a relatively inexpensive design which may be opened and closed in a minimum of time.

An additional object of the invention is the provision of sealing means for a hatch cover particularly adaptable for use on a railway car having its interior subjected to air pressure with the sealing pressure being proportionate to the air pressure within the car, a high air pressure within the car effecting a high sealing force or pressure exerted against the sealing means.

Another object of the invention is the provision of a hatch cover assembly in which deflections or distortions of the hatch cover do not materially affect the operation of the seal or sealing means.

Briefly described, the invention comprises a hatch cover mounted for movement over a hatch fitting surrounding a hatch opening of a closed vessel, the hatch cover mounted over the hatch fitting for pivotal movement about a generally horizontal axis between open and closed positions relative to the hatch opening, the hatch covering having a rim positioned outwardly of and spaced from the hatch fitting when the hatch cover is in closed position, a resilient sealing member positioned between the outer periphery of the hatch fitting and the inner periphery of the rim to provide a seal between the hatch fitting and hatch cover, and means to releasably retain the hatch cover in closed position over the hatch fitting.

The invention accordingly comprises the constructions hereinafter described, the scope of the invention being indicated in the following claims.

In the accompanying drawings in which one of various possible embodiments of the invention is illustrated, FIGURE 1 is a perspective of a railway hopper car having a plurality of generally circular hatch assemblies spaced longitudinally along the roof of a car;

FIGURE 2 is an enlarged plan of a hatch structure embodying the present invention and showing the hatch cover in closed position over an associated hatch opening;

Corresponding reference characters indicate corresponding parts throughout the several views of the drawings.

Figure 4:
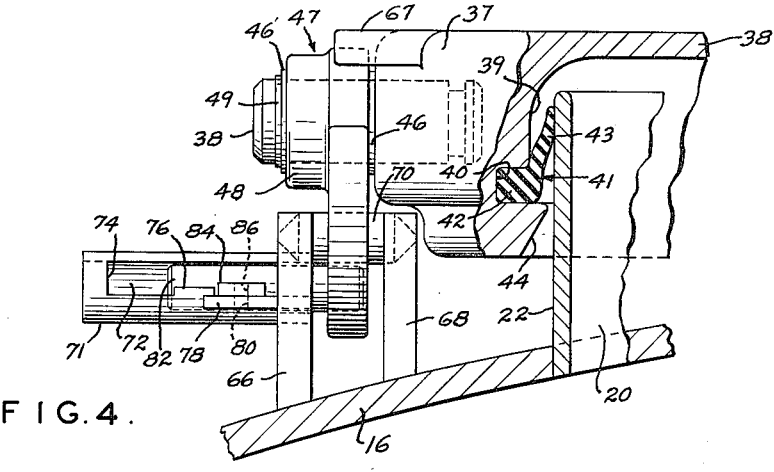
FIGURE 4 is an elevation of the force applying means of FIGURE 3 with certain parts being broken away.

Referring to FIGURE 1 of the drawings, a closed vessel is illustrated as a railway hopper car generally designated 10 and has a wheel truck 12 at each end. A shell 14 defines the interior of car 10 and has a roof 16 thereby to form a vessel for the storage and transportation of materials, such as, for example, flour, cement, lime, graphite, and the like. While such a railway hopper car is normally pressurized, it is to be understood that the present invention may be employed with railway hopper cars other than those having pressurized vessels or interiors, or to railway tank cars. Also, the present invention may be employed in any type of storage tank or vessel where it is desired to employ a hatch cover structure.

Mounted on roof 16 is a running board generally designated 18 to provide a support for workmen on top of the car. Spaced along the longitudinal axis of car 10 are a plurality of roof openings 20 generally circular in shape and of a predetermined diameter. A cylindrically-shaped hatch ring or fitting 22 extends about each opening 20 and is secured, such as by welding, to the adjacent edge of roof 16. A hatch cover assembly or structure designated generally 24 is positioned over each of the hatch openings 20. Hatch cover structure 24 comprises a cast hatch cover 26 having a generally circular body 28 and a peripheral rim 30 to form a hat-shaped or cup-shaped hatch cover. Extending from body 28 is a hinge 32 mounted around pin 34. Bracket arms 36 secured to roof 16 support pin 34 and hatch cover 26 pivots about pin 34 when moved between open and closed positions. Rim 30 has oppositely facing portions 37 of an increased thickness. A pin 38 extends outwardly from each increased thickness portion 37 and is cast in place with the cast hatch cover 26.

The inner surface 39 of rim 30 has an annular groove 40 therein. A sealing ring 41 (see FIGURE 4) has a base 42 fitted within groove 40 and secured by a suitable adhesive. Extending from base 42 is a lip 43 adapted to fit against the adjacent surface of hatch ring 22 to seal hatch opening 20. The upper surface of lip 43 is exposed to pressure within the car and the lower surface of lip 43 is exposed to atmospheric pressure. Thus, upon pressure interiorly of the car exceeding atmospheric pressure lip 43 presses with an increased force against hatch ring 22. Sealing ring 41 is formed preferably of an elastomeric material, such as, for example, rubber. The lower edge of rim 30 is beveled at 44 to aid in positioning or guiding hatch cover 26 when closed. Hinge 32 is mounted loosely about pin 34 and upon closing of cover 26 beveled edge 44 engages the upper edge of hatch ring 22 to guide cover 26 downwardly about hatch ring 22. When a vacuum or negative pressure exists interiorly of the car the lower surface of hatch ring 41 has a tendency to move away from engagement with hatch ring 22 as it is exposed to the atmosphere. Thus, air is permitted to enter the car upon a negative pressure being reached interiorly of the car. If desired, the sealing ring 41 may be constructed and formed of a material which will permit air to enter the interior of the car at a predetermined negative pressure thereof to prevent an excessive negative pressure being reached interiorly of the car. It is to be noted that hatch cover 26 is spaced from the upper edge of hatch ring 22 and does not contact or engage hatch ring 22 in any manner and a relatively large clearance exists between hatch cover 26 and ring 22. Thus, upon distortion or slight movement of hatch cover 26 relative to hatch ring 22, an air-tight seal will be maintained against hatch ring 22 by seal 41. Relatively large vertical movements or distortions of sealing ring 41 or hatch cover 26 will not result in any malfunctioning or any reduction in the effectiveness of the sealing action of the hatch cover.

Pivotally mounted on each pin 38 for relative rotation is a handle generally designated 47 having a hub 48 fitting about pin 40. A retaining ring 49 prevents handle 47 from slipping off the end of pin 40. A friction ring 46 on each side of handle 47 retains the handle in position after it has been rotated.

Handle 47 has a shank 50 which may be easily gripped for applying leverage. Leading from the edge of handle 47 opposite shank 50 is a cam slot or track 51 defined by an inner cam surface 52 and an outer cam surface 53 which terminate in a generally semi-circular end surface 54. Outer cam surface 53 has a high portion 55 adjacent end surface 54 and a low or recessed portion 56 adjacent the entrance to cam slot 51. Portion 55 is at a minimum distance along cam surface 53 from the axis of rotation of handle 47 while portion 56 is at a maximum distance along cam surface 53 from the axis of rotation of handle 47. A boss or knob 59 forms a pocket 60 on the edge of handle 47 adjacent shank 50.

Extending upwardly from roof 16 are spaced projections 66 and 68 secured, such as by welding, to roof 16. Mounted between and secured to extensions 66 and 68 is a retaining pin or bar 70 adapted to ride in cam slot 51 upon rotation of handle 47 when the hatch cover is opened and closed. In the event the interior of the railway car is under a positive pressure, hatch cover 26 is urged upwardly and pin 70 rides against cam surface 53 upon opening of the hatch cover. If the interior of railway car 10 is not under a positive pressure, pin 70 rides against cam surface 52 upon opening of the hatch cover. A stop 67 extends from hatch cover 26 and restrains rotation of handle 47 when the hatch cover is opened.

Secured to projection 66 is a sleeve 71 having a quadrant cut away from a longitudinally extending slot 72. An abutment 74 is formed at the outer end of slot 72 and a detent 76 extends upwardly intermediately of slot 72. A lug 78 secured to sleeve 70 extends outwardly adjacent detent 76 and has an opening 80 therethrough.

Figure 3:
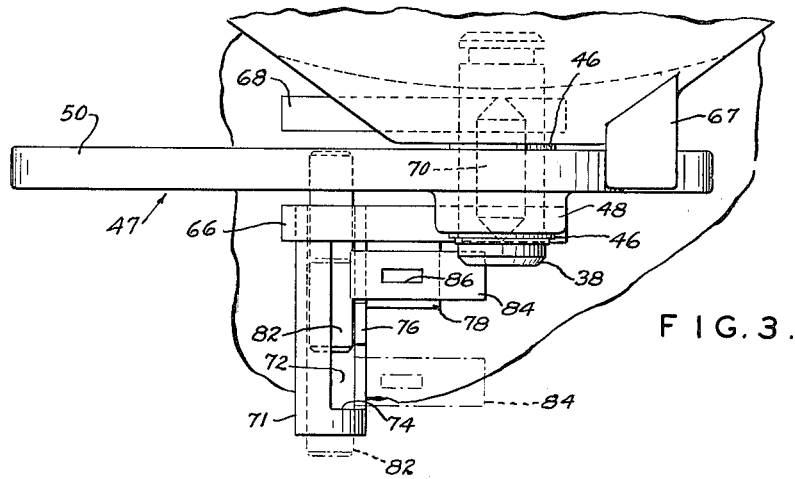
FIGURE 3 is an enlarged fragment of FIGURE 2 showing a force applying means for holding the hatch in secured position.
Figure 5:
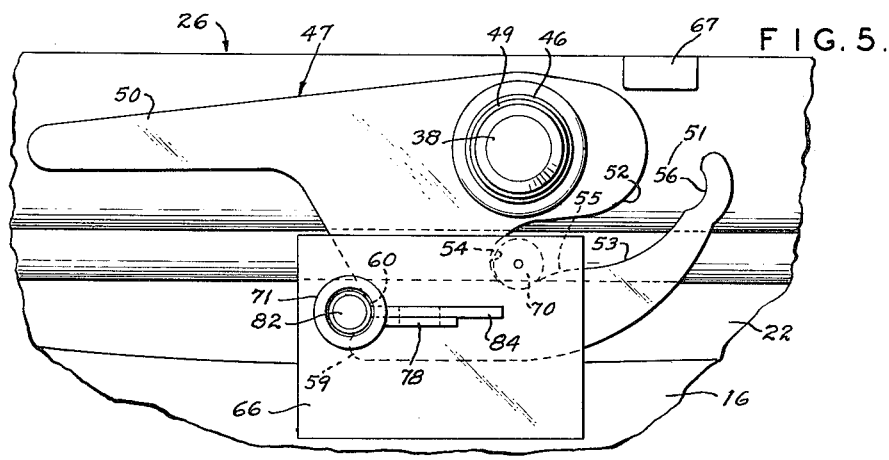
FIGURE 5 is an end elevation of the force applying means shown in FIGURE 3.
Figure 6:
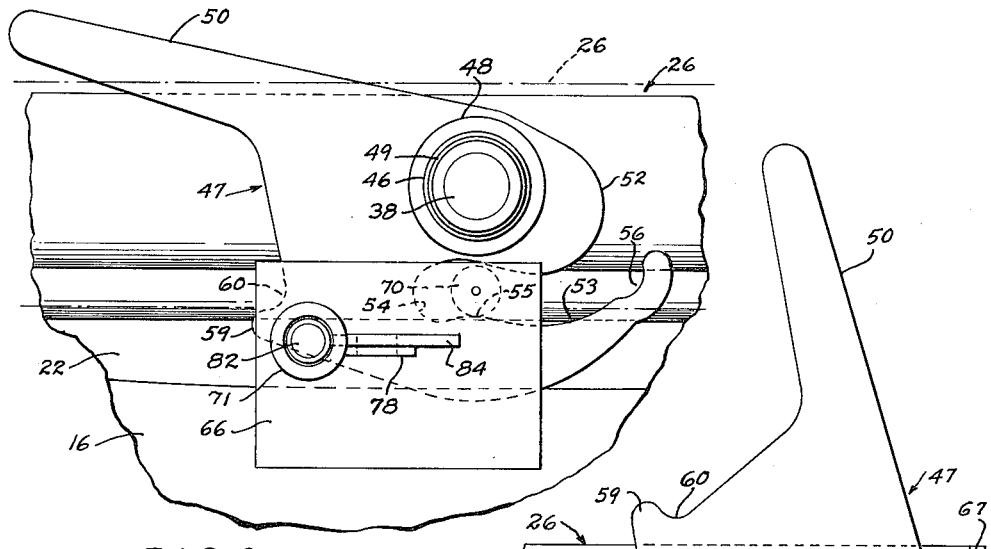
FIGURE 6 is an end elevation similar to FIGURE 5 and showing the force applying means slightly rotated from the closed position of the hatch cover.

Mounted within sleeve 71 for sliding movement is a locking pin 82. A finger 84 is secured to pin 82 and may be easily gripped for moving pin 82 back and forth within slot 72. As shown in FIGURES 3 and 5, pin 82 fits within pocket 60 against boss 59 when the hatch cover is closed and handle 47 is rotated. Finger 84 rests against lug 78 and has an opening 86 alignable with opening 80 when pin 82 and handle 47 are in locked position. A sealing device (not shown) may be passed through aligned openings 80, 86 to insure locking pin 82 is in position and to prevent or detect unauthorized opening of the hatch cover.

Figure 7:
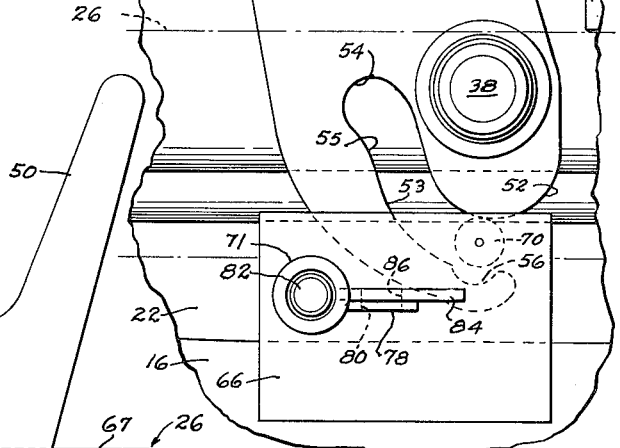
FIGURE 7 is a view similar to FIGURE 6 and showing the force applying means rotated to another position.
Figure 8:
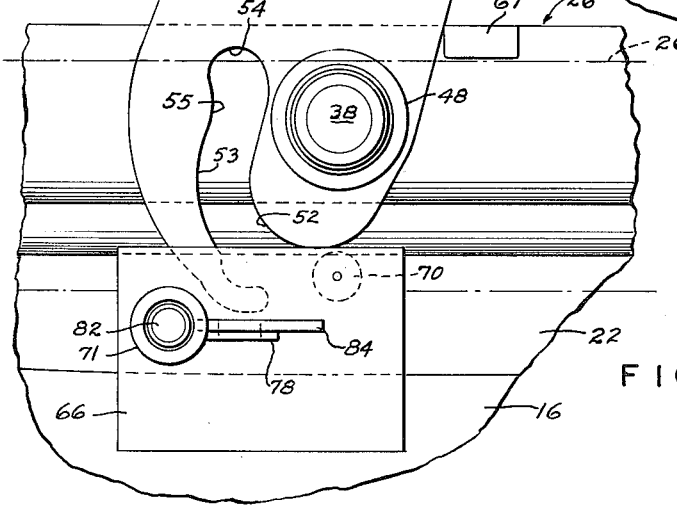
FIGURE 8 is a view similar to FIGURES 5–7 showing the force applying means in a further position.

To close and lock hatch cover 26 from the unlocked position shown in FIGURE 8, the hatch cover is first lowered about hatch ring 22 with seal ring 41 engaging the adjacent surface of the hatch ring to form an airtight seal. Beveled portion 44 aids in guiding the hatch cover downwardly. Handle 47 is normally retained by friction washers 46 in the upright position shown in FIGURE 8 against stop 67 and is rotated away from stop 67 in a counterclockwise position as viewed in FIGURES 5–8, to draw cover 26 downwardly toward hatch ring 22. Upon pin 70 reaching high portion 55 the cover is in its lowermost position on hatch ring 22. As pin 70 moves from cam portion 55 to end surface 56 the cover is raised slightly. Upon handle 47 reaching the position of FIGURE 5, locking pin 82 may be moved inwardly to the solid-line position of FIGURE 3 and fit within pocket 60.

To release each handle 47, finger 84 is lifted to rotate pin 82 slightly to permit finger 84 to clear lug 76. Then locking pin 82 is first moved out of engagement with its associated boss 59 of handle 47. Handles 47 are now free to rotate. Initial rotation of handle 47 until pin 70 reaches portion 55 effects a downward movement of cover 26 since portion 55 is closer to the axis of rotation of handle 47 than is end surface 54. Upon movement of handle 47 from end surface 54 to portion 55 relative to pin 70, hatch cover 26 moves downwardly from the broken line position shown in FIGURE 6 to the solid line position shown in FIGURE 6. Thus, if a relatively high pressure exists within the interior of car 10, it is very difficult to move handle 47 initially as cover 26 is being pulled down onto hatch ring 22 against the pressure within the railway car. This prevents injury to an operator of the hatch cover and loss of material from the hatch opening as might occur if the cover were opened when a substantial air pressure existed within the car. In the event a workman is able to move handle 47 past raised portion 55, pin 70 will be caught in recessed portion 56 as the pressure within the railway car urges pin 70 against cam surface 53. Thus, an added safety feature is provided by recessed portion 56 to prevent injury to workmen opening the hatch cover when the interior of the railway car is under pressure. Referring to FIGURES 7 and 8, the fully closed position of the hatch cover 26 is indicated by broken lines. Upon swinging of hatch cover 26 to fully opened position as shown in FIGURE 1, handles 47 engage the upper surface of roof 16 to provide a support or rest for the hatch cover. Stops 67 prevent rotation of handles 47 when roof 16 is engaged.

Upon a suction or vacuum exerted within the interior of car 10, atmospheric pressure outside the car which is exposed to the lower portion of sealing member 41 tends to press the sealing member away from engagement with hatch ring 22. This prevents a relatively high vacuum or negative pressure from being reached within the interior of car 10.

From the foregoing, it is to be understood that the present hatch cover structure provides a hatch cover structure in which the hatch cover is not positioned in contact with the upper edge of hatch ring 22 when the cover is in closed position. Handles 47 and pins 70 position and space hatch cover 26 from the adjacent upper edge of hatch ring 22. Sealing ring 41 engages the adjacent surface of hatch ring 22 and even though wide tolerances or clearances exist between hatch cover 26 and ring 22, hatch opening 20 is effectively sealed. If desired, hatch cover 26 and hatch ring 22 may be formed of an oval or elongated shape.

The employment of only two handles 47 permits the hatch cover to be opened and closed in a minimum of time. A workman may grip and rotate both handles 47 simultaneously when it is desired to open or close the hatch cover. As the resilient sealing member 41 is positioned between the outer periphery of hatch ring 22 and the inner periphery of rim 30 a slight vertical deflection of movement of hatch cover 26 will not affect the sealing action between sealing member 41 and hatch ring 22. Thus, the sealing of hatch cover 26 is effectively accomplished with the utilization of only two handles.

In view of the above, it will be seen that the several objects of the invention are achieved and other advantageous results attained.

As various changes could be made in the above constructions without departing from the scope of the invention, it is intended that all matter contained in the above description and shown in the accompanying drawings shall be interpreted as illustrative and not in a limiting sense.

What is claimed is:

1. In an enclosed vessel having a roof and a roof opening extending through the roof to permit access to the interior of the vessel, a hatch fitting extending about the roof opening upwardly of the roof, a hatch cover mounted over said hatch fitting for pivotal movement between open and closed positions relative to the hatch openings, the hatch cover having a rim positioned outwardly of and spaced from the hatch fitting when the hatch cover is in closed position, a resilient sealing member secured to the inner periphery of the hatch rim and having a free unrestrained lip adapted to fit against the outer periphery of the hatch fitting to provide a seal between the hatch fitting and hatch cover in the closed position of the cover, and means to releasably retain the hatch cover in closed position over the hatch fitting and to position the hatch cover at a predetermined height spaced from the upper extending edge of the hatch fitting in the closed position of the cover whereby said lip is exposed to the interior of the vessel and presses against the hatch fitting with an increased sealing force upon a positive pressure being exerted interiorly of the vessel.

2. In a railway covered hopper car having a roof and a generally circular roof opening of a predetermined diameter extending through the roof to permit access to the interior of the car, a generally cylindrical hatch ring extending about said roof opening upwardly from the roof, a hatch cover mounted over said hatch ring for pivotal movement about a generally horizontal axis between open and closed positions relative to the hatch opening, the hatch cover including a rim in concentric outwardly spaced relation to said hatch ring when the hatch cover is in closed position, a resilient sealing member secured to the inner periphery of the rim and having an inwardly extending free lip adapted to deform and fit against the adjacent outer periphery of the hatch ring in the closed position of the hatch cover, and means to releasably retain the hatch cover in closed position over the hatch ring and to position the hatch cover at a predetermined height spaced from the upper extending edge of the hatch ring in the closed position of the cover whereby said lip is exposed to the interior of the car and presses against the hatch ring with an increased sealing force upon pressure being exerted interiorly of the car.

3. In a railway covered hopper car as set forth in claim 2, said means to releasably retain the hatch cover comprising a separate force applying device at each of two positions about the periphery of the hatch cover, each force applying device including a handle pivotally carried by a pin extending from said rim, and a catch on the railway car adjacent each handle adapted for engagement by the handle to secure the handle into position.

4. In a railway covered hopper car as set forth in claim 2, a pair of oppositely facing pins extending in a generally horizontal direction from the outer circumference of the rim, a handle mounted on each of the pins for rotation and having a cam slot therein, said means to releasably retain the hatch cover including a retaining member secured to the adjacent roof of the car and adapted to fit within said cam slot upon closing of the hatch cover and rotation of the handles, said cam slot being constructed and arranged so that rotation of the associated handle closes and seals the hatch cover in closed position.

5. In a railway covered hopper car as set forth in claim 4, means to lock each handle in the closed position of the hatch cover including a sliding locking pin movable toward and away from the associated handle and adapted to engage and lock the handle against rotation when the retaining member is fully seated in the cam slot.

6. In an enclosed vessel having a roof and a generally circular roof opening extending through the roof to permit access to the interior of the vessel, a generally cylindrical hatch ring extending about said roof opening upwardly from the roof, a hatch cover mounted over said hatch ring for pivotal movement about a generally horizontal axis between open and closed positions relative to the hatch opening, at least one handle carried by the hatch cover and mounted for rotation outwardly of the outer periphery of the hatch cover, retaining means on the roof of the vessel adapted to engage the handle in interfitting relation, said retaining means and handle having coacting cam members, one of the cam members mounted on the retaining means and the other coacting cam member mounted on the handle whereby upon rotation of the handle when the cover is over the hatch ring the engagement of the coacting cam members pulls the hatch cover downwardly toward the hatch ring until the cam members are fully engaged, a sleeve mounted on the roof and having a generally horizontally extending slot along its longitudinal axis, a slidable locking pin mounted within said sleeve for sliding relative movement and movable toward and away from the handle to engage and lock the handle against rotation in at least one direction when the cam members are fully engaged, said locking pin having a finger extending through said slot in a direction generally perpendicularly to the longitudinal axis of the pin, said slot having a restricted portion intermediate its ends formed by a detent extending upwardly into the slot, said finger positioned adjacent the detent and restraining the locking pin against movement when the pin is in locking engagement with the handle, and a lug extending outwardly from said sleeve adapted to be positioned adjacent the finger of said locking pin when the locking pin is in locking engagement with the handle, said lug and sleeve having mating openings therein alignable when the locking pin is in locking engagement whereby securing means may be positioned through the aligned openings to hold the locking pin in locked position.

7. In an enclosed vessel having a roof and a generally circular roof opening extending through the roof to permit access to the interior of the vessel, a generally cylindrical hatch ring extending about said roof opening upwardly from the roof, a hatch cover mounted over said hatch ring for pivotal movement about a generally horizontal axis between open and closed positions relative to the hatch opening, at least one handle carried by the hatch cover and mounted for rotation outwardly of the outer periphery of the hatch cover, a cam track on said handle, a fixed retainer bar mounted on the roof and adapted to fit within the cam track when the hatch cover is closed and the handle rotated whereby the hatch cover is pulled downwardly toward the hatch ring until the bar is fully seated with the cam track, said cam track having an entrance opening and a recessed portion adjacent the entrance opening being at a maximum distance from the axis of rotation of said handle whereby upon opening of the hatch cover with a positive pressure within the vessel the retaining bar is caught in said recessed portion and prevents the hatch cover from being opened except under an unusually large force being applied to the handle, and a slidable locking pin movable toward and away from the handle to releasably lock the handle in a fully closed position of the hatch cover with the bar seated at the inner end of the cam track and preventing rotation of the handle.

8. In an enclosed hopper structure adapted to be pressurized, a roof having a generally circular opening of a predetermined diameter to permit access to the interior of the hopper structure, a generally cylindrical hatch ring about said roof opening extending upwardly from the roof, a hatch cover mounted over said hatch ring and having a rim in concentric outwardly spaced relation to said hatch ring when the hatch cover is in closed position, means on the roof mounting the hatch cover for pivotal movement about a generally horizontal axis between open and closed positions relative to the hatch opening, a resilient sealing member positioned between the outer periphery of the hatch ring and the inner periphery of the hatch rim to provide a fluid tight seal between the hatch ring and hatch cover, a pair of oppositely arranged force applying retaining means about the periphery of the hatch cover to position positively the hatch cover at a predetermined height relative to the hatch ring in the closed position of the cover with the upper edge of the ring spaced from the inner surface of the hatch cover whereby the sealing member is exposed to any pressure within the hopper structure, the pair of force applying retaining means being spaced in opposite directions about the circumference of the hatch cover rim around 90° from the pivotal mounting of the hatch cover and each retaining means being independently actuated, each retaining means comprising a pair of coacting cam members with one of the cam members carried by the hatch cover and the other coacting cam member mounted on the roof, one of the cam members comprising a pivotally mounted handle having a cam slot therein and the other cam member comprising a retaining bar adapted to fit within the cam slot when the hatch cover is closed and the handle rotated, said cam slot having an entrance opening and a recessed portion adjacent the entrance opening being at a maximum distance from the pivotal axis of said handle whereby upon opening of the hatch cover with a positive pressure within the hopper structure the retaining bar is caught in said recessed portion and prevents the hatch cover from being opened except under an unusually large force being applied to the handle.

9. In an enclosed hopper structure adapted to be presssurized, a roof having a generally circular opening of a predetermined diameter to permit access to the interior of the hopper structure, a generally cylindrical hatch ring about said roof opening extending upwardly from the roof, a hatch cover mounted over said hatch ring and having a rim in concentric outwardly spaced relation to said hatch ring when the hatch cover is in closed position, means on the roof mounting the hatch cover for pivotal movement about a generally horizontal axis between open and closed positions relative to the hatch opening, a resilient sealing member positioned between the outer periphery of the hatch ring and the inner periphery of the hatch rim to provide a fluid tight seal between the hatch ring and hatch cover, and releasable securing means to position positively the hatch cover at a predetermined height relative to the hatch ring in the closed position of the cover with the upper edge of the ring spaced from the inner surface of the hatch cover whereby the sealing member is exposed to the interior of the hopper structure, said securing means comprising a pair of interfitting cam members with one of the cam members carried by the hatch cover and the other cam member mounted on the roof, one of the cam members being a pivotally mounted handle adapted to be rotated in one direction when the cam members first engage upon initial closing of the hatch cover to draw the hatch cover downwardly and position the lip of said sealing member in sealing relation to the hatch ring with the hatch cover spaced from the upper edge of the hatch ring, said handle being rotated in an opposite direction to raise the cover for movement to open position from closed position.

10. In an enclosed hopper structure adapted to be pressurized, a roof having a generally circular roof opening of a predetermined diameter to permit access to the interior of the hopper structure, a generally circular hatch ring about said roof opening extending upwardly from the roof, a hatch cover mounted over said hatch ring, means on the roof mounting the hatch cover for pivotal movement about a generally horizontal axis between open and closed positions relative to the hatch opening, a resilient sealing member positioned between the hatch ring and the hatch cover to provide a fluid tight seal, at least one handle carried by the hatch cover and mounted for rotation outwardly of the outer periphery of the hatch cover, a cam track on said handle, and a fixed retainer bar on the roof adapted to fit within the cam track when the hatch cover is closed and the handle rotated whereby the hatch cover is pulled downwardly toward the hatch ring until the retainer bar is fully seated in the cam track, said cam track having an entrance opening and a recessed portion adjacent the entrance opening being at a maximum distance from the axis of rotation of said handle whereby upon opening of the hatch cover with a positive pressure within the hopper structure the retainer bar is caught in said recessed portion and prevents the hatch cover from being opened except under an unusually large force being applied to the handle.

References Cited by the Examiner

UNITED STATES PATENTS

| | | | |
|---|---|---|---|
| 1,755,015 | 4/1930 | Muller | 292—241 |
| 2,003,113 | 5/1935 | Gilpin | 105—377 |
| 2,204,328 | 6/1940 | Swanson | 105—377 |
| 2,620,206 | 12/1952 | Cornelius | 277—212 X |
| 2,816,683 | 12/1957 | Miers | 105—377 X |
| 3,039,837 | 6/1962 | Poe | 292—241 X |

FOREIGN PATENTS 166,482   3/1934   Switzerland.

ARTHUR L. LA POINT, *Primary Examiner.*